Sept. 13, 1955  M. R. LAING  2,717,938
CONTROL DEVICE
Filed Feb. 2, 1953
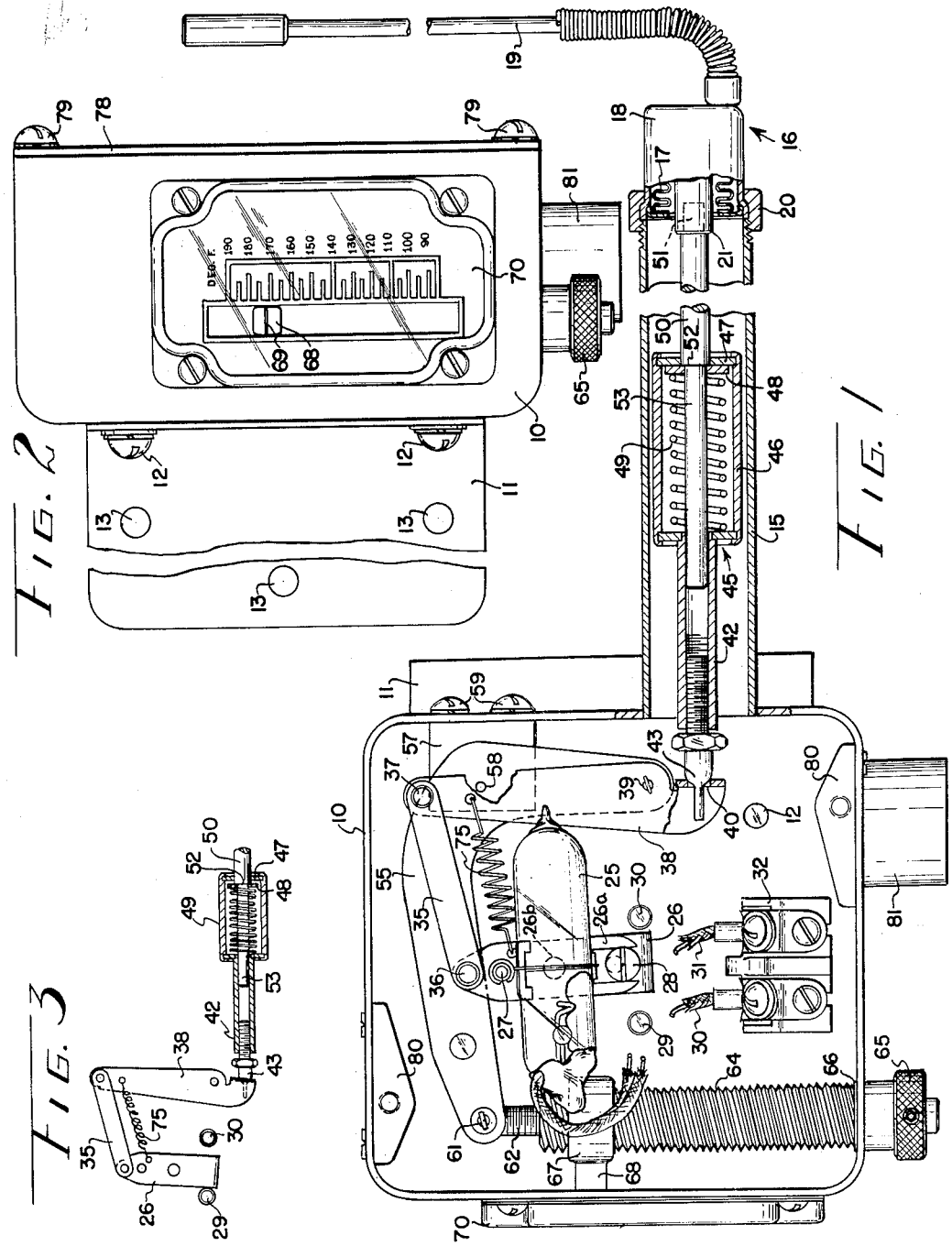
INVENTOR.
MARVIN R. LAING
BY George H. Fisher
ATTORNEY

United States Patent Office 2,717,938
Patented Sept. 13, 1955

2,717,938

CONTROL DEVICE

Marvin R. Laing, Minneapolis, Minn., assignor to Minneapolis-Honeywell Regulator Company, Minneapolis, Minn., a corporation of Delaware Application February 2, 1953, Serial No. 334,574

8 Claims. (Cl. 200—140)

This invention relates to condition responsive control devices and more specifically to a controller having a sensing element remotely located with respect to the main body of the device.

An object of the invention is to provide a control device in which very small movement of the sensing element is greatly amplified to actuate a control element.

Another object is to provide a control device in which a large multiplication of movement is attained without accompanying lost motion.

Another object is to provide a control device having a motion multiplying linkage between the sensing element and a control element requiring a reversal in force to move it in opposite senses, wherein there is a minimum of lost motion thereby affording more accurate control.

Another object is to provide a control device of the above type wherein avoidance of lost motion is attained without resorting to highly accurate manufacturing technique.

A further object of the invention is to provide a control device having a motion multiplying linkage between the sensing element and the control element wherein a single spring is effective to maintain a unidirectional load on various mechanical connections as well as to bias the linkage with respect to the sensing element. To control accurately and with minimum differential between the cut-in and cut-out temperatures at which a switch operates, it is essential that lost motion, friction, and resilience be as low as possible. The spring is so disposed in the linkage and is of such strength as to substantially eliminate backlash in the various pivotal connections. The disposition of the spring is such as to exert a force just sufficient to reduce backlash to a negligible value on the several significant pivots, thereby holding friction in these pivots to a minimum. The spring is disposed, however, to exert a somewhat larger force on one of the pivots in order to apply a rather high loading on the temperature sensing element, which, in the illustrative embodiment of the invention, is a liquid filled expansible chamber. It has been found that liquid filled sensing elements behave in a somewhat resilient fashion but that suitable preloading reduces the loss incident to such resilience. This effect is in part due to bulging of the bellows which changes to a greater extent on changes in force on the bellows at low force values than at higher force values, and is in part due to the presence of volatile constituents and gas in the liquid which cause the bellows to act in a more resilient manner at low pressure than at high pressure. This force is also transmitted to the various mechanical connections of the temperature adjusting mechanism to assure maintenance of accurate adjustment. The structure of the invention not only practically eliminates lost motion in the pivots without introducing an objectionable amount of friction but also preloads the liquid filled sensing element as required to obtain positive operation.

In the drawing:

Figure 1 is an elevation, partly in section, of a temperature sensitive switch incorporating the invention, Figure 2 is an elevation, taken from the left of Figure 1, and showing the adjusting scale, and Figure 3 is a fragmentary view showing a portion of the switch actuating linkage in the position it assumes when the temperature is considerably above the selected control temperature.

The invention will be illustrated in connection with a device designed primarily to control the supply of heat to a tobacco curing barn. In this application it is desirable to control from the average of temperatures existing in various parts of the enclosure, and to this end the sensing element employed is a chamber completely filled with liquid and comprises an elongated flexible tube connected to a bellows. In order to minimize the effect of outside temperature, the bellows as well as the tube is disposed within the enclosure to be heated and a mechanical connection transmits bellows movement to the main body of the device which is adapted to be located on the outside of the barn. The bellows is mounted on an extension of the instrument frame of sufficient length to extend through the wall of a tobacco barn which may be of masonry construction.

A frame 10 in the form of a pressed metal box has an angle shaped mounting bracket 11 secured thereto by screws 12. Holes 13 are provided in the bracket to facilitate securing the device to a vertical wall. A tubular extension 15 is secured to the frame 10 at an opening therein and is adapted to extend through the wall to which the device may be attached.

A temperature sensing element 16 is carried on the end of extension 15 and comprises a bellows 17 mounted within a bellows housing 18, and a flexible tube 19 extending from the housing 18 and closed at its remote end. Both the tube 19 and the space between the bellows 17 and the housing 18 are completely filled with a suitable temperature responsive liquid such as toluene. An internally threaded collar 20 secures the sensing element 16 to the extension 15. A stud 21 is secured to the movable end of the bellows 17 and extends outwardly therefrom to transmit bellows movement to the linkage to be described below.

A mercury switch 25 is carried by a lever 26 which is pivotally mounted in frame 10 on a pin 27. The switch 25 is carried on a bracket 26a which is pivoted on the lever 26 at 26b and may be pivotally adjusted relative to the lever 26 by turning an eccentric 28. Movement of the lever 26 is limited by pins 29 and 30 on the frame 10. The lever 26 is permitted sufficient freedom of movement to actuate the mercury switch positively between on and off positions but not enough movement is permitted to disarrange or strain a pair of lead wires 30 and 31 which interconnect the switch 25 and a terminal block 32.

The lever 26 which carries the mercury switch is operatively connected to the stud 21 on the bellows 17 by a linkage that includes a link 35, a lever 38, a rod 42, a strain release mechanism 45, and a rod 50 which has a reduced end 51 that is received in the outer end of the stud 21. The link 35 is pivotally connected to the lever 26 by a pin 36 and is pivotally connected to the lever 38 by a pin 37. The lever 38 is pivoted relative to the frame 10 on a pin 39. As will be seen hereinafter the pin 39 may be shifted relative to the frame by a control point adjusting mechanism. The lower end of the lever 38 is provided with an opening 40 which receives an outer adjustable portion 43 of the rod 42. Rotation of the portion 43 relative to the rod 42, in which it is screw threaded, changes the effective length of the rod 42 and provides the calibration adjustment for the device. The surface of the portion 43 that engages the lever 38 preferably has a spherical configuration to provide a pivotal connection between these two members.

The strain release mechanism 45 is provided to allow continued movement of the bellows 17 after the lever 26 has been moved into engagement with the stop pin 29 due to excessive rise in temperature or when the control point is adjusted to a lower value. The strain release mechanism 45 comprises a tube 46 rigidly attached to the rod 42, an abutment plate 47 secured to the tube 46 and a disc 48 which is biased into engagement with the plate 47 by a helical compression spring 49. The disc 48 also engages a shoulder 52 on the rod 50. The rod 50 is provided with a reduced portion 53 which extends into the interior of the rod 42 to maintain the rods 42 and 50 in alignment. If motion of the rod 42 to the left is prevented then continued motion of the rod 50 in that direction will cause the disc 48 to move away from the plate 47 and compress the spring 49 as shown in Figure 3.

As mentioned above the pin 39 which pivotally carries the lever 38 may be shifted in the frame 10 to adjust the control point of the device. The pin 39 pivotally connects the lever 38 and a bell crank lever 55 which is pivotally mounted with respect to a bracket 57 by a pin 58. The bracket 57 is secured to the frame 10 by a pair of screws 59. The other end of the lever 55 is pivotally connected by a pin 61 to a screw threaded member 62, the threads of which cooperate with internal threads (not shown) in an adjusting screw 64. The adjusting screw 64 is provided with an adjusting knob 65 on the outside of the frame 10 which may be rotated to turn the screw 64. Rotation of screw 64 raises or lowers the screw threaded member 62 which, in turn, angularly positions the bellcrank lever 55. A spring washer 66 intermediate the adjusting screw 64 and the frame 10 serves to maintain the screw in its angularly adjusted position while permitting a little change in angle between the axis of the screw and the frame as required in moving the lever 55.

The adjusting screw 64 is externally threaded to provide a multiple thread screw engaging a nut 67 which has a lateral extension 68. As seen in Figure 2, the extension 68 on the nut 67 has an index 69 thereon which cooperates with suitable indicia of temperature on a scaleplate 70. The steep pitch on the adjusting screw 64 causes a large movement of the index 69 for the same angular movement that is required to provide only a relatively small movement of the screw threaded member 62 which adjusts the bell crank lever 55. This construction enables the scale to be spread out for easy reading.

It will be seen that adjustment of the control point by turning the knob 65 will shift the pin 39, which carries the lever 38, in a direction either toward or away from the bellows 17 thereby changing the temperature at which the mercury switch 25 is actuated. The device is calibrated by adjusting the length of the connection between the bellows 17 and the lever 38 by adjusting the extension 43 relative to the rod 42 to obtain coincidence of the actual temperature of the sensing element 16 and the temperature indicated by the index 69 on the scaleplate 70.

The mechanism described above provides a one way connection between the extension 43 of the rod 42 and the lever 38, and since the mercury switch 25 must be positively actuated in both directions, the lever 26 would not follow movements of the bellows 17 in the direction of reduced temperature to actuate the mercury switch to open circuit position. In order to bias the lever 38 into engagement with the extension 43 of the rod 42 a tension spring 75 is provided interconnecting the levers 26 and 38. The spring 75 engages the lever 38 above the pivot 39 and therefore biases the lever 38 in a counterclockwise direction causing its lower extremity to bear against the extension 43 of the rod 42. The left hand end of the spring 75 engages the lever 26 below the pivot 27 and therefore biases the lever 26 in a counterclockwise direction which places the link 35 in tension and maintains a substantially unidirectional loading on the pins 27, 36, and 37. It will be noted that the force applied by the spring 75 on the lever 26 is on a line only slightly removed from the pivotal axis of the lever 26 and therefore the loading on the pins 36 and 37 is relatively low while the loading on the pin 27 is only slightly more than the actual force applied by the spring 75. On the other hand, the force applied by the spring 75 on the lever 38 is on a line considerably removed from the axis provided by the pin 39 as compared with the distance between the pin 39 and the pivot of the extension 43 in the lever 38. Therefore the force of the spring 75 is multiplied several times as reflected in force applied lengthwise of the rod 42. This magnified force, as mentioned earlier, is useful in preloading the bellows 17 in causing bellows movement to more accurately reflect changes in temperature. Experiments have shown that if the line of application of the force of the spring 75 is moved toward the pin 39, the temperature differential between the opening and closing points of the switch 25 will be increased, thereby illustrating the advantage of providing relatively high preloading of the bellows 17. In addition to eliminating backlash in the operating pivots, the spring 75 also takes up backlash in the pivots 58 and 61 associated with the adjusting mechanism. Also the load of the screw threaded member 62 on the internal threads of the adjusting screw 64 is kept unidirectional by the spring 75.

It will be seen that the disposition of the spring 75 relative to the linkage provides accuracy of control by eliminating backlash from the linkage without providing excessive friction and by preloading the liquid filled bellows.

A cover plate 78, shown in Figure 2, is secured to the frame 10 by screws 79 which engage brackets 80 on the frame 10. A suitable electrical conduit connection 81 is also provided on the lower portion of the frame.

Various changes in structure could, of course, be made in the structure without departing from the spirit of the invention. The scope of the invention is to be limited by the following claims.

I claim as my invention:

1. A temperature sensitive controller comprising, a frame, an elongated tubular extension extending laterally from said frame, an expansible container carried by said tubular extension on the end thereof remote from said frame, said container being completely filled with a liquid adapted to change volume in accordance with temperature, a member pivoted in said frame and having a portion remote from its pivot movable in an arc toward and away from said expansible container, means for angularly positioning said member in said frame, a first lever pivoted intermediate its two ends in said portion of said member, a strut extending between said expansible container and a first end of said lever and within said tubular extension, said strut having a one way connection with said lever and having a strain release permitting continued movement of said chamber on restraint of said lever, a second lever pivoted intermediate its two ends in said frame, a link pivotally connected to the second end of said first lever and to a first end of said second lever, cooperating stops on said frame and said second lever, a mercury switch actuated by said second lever, and a spring interconnecting the second ends of said first and second levers.

2. A temperature sensitive controller comprising, a frame, a temperature responsive element carried by said frame, a first lever adapted to be engaged by a movable portion of said element, a second lever disposed generally parallel to said first lever, a mercury switch mounted on said second lever, a pivotal connection between said first lever and said frame, a pivotal connection between said second lever and said frame, a link, pivotal connections between said link and each of said levers, and a spring connected at one end to one of said levers at a point on the same side of the pivotal axis of said lever in said frame as the pivotal axis of said link in that lever and connected at its other end to the other of said levers at a point spaced from the pivotal axis of said lever in said frame and on the opposite side thereof from the pivotal axis of said link in that lever, said spring maintaining a substantially unidirectional load on each of said pivotal connections and biasing said first lever with respect to said condition responsive element.

3. A temperature sensitive controller comprising, a frame, a temperature sensing element carried by said frame, a member adjustably positionable in said frame relative to said element, a first lever pivoted intermediate its two ends in said member and having a one way connection between a first end and said element, a second lever pivoted intermediate its two ends in said frame, a link means interconnecting the second end of said first lever and a first end of said second lever, a switch actuated by said second lever, and a spring interconnecting the second ends of said first and second levers, said spring maintaining a substantially unidirectional load on all of the enumerated connections and biasing said first lever toward said element.

4. A temperature sensitive controller comprising, a frame, a temperature sensing element carried by said frame, a member pivoted in said frame, screw threaded means having a portion rotatable in said frame for angularly positioning said member in said frame, said member having a pivotal connection with another portion of said screw threaded means, a first lever pivoted intermediate its two ends in said member and having a one way connection between a first end and said element, a second lever pivoted intermediate its two ends in said frame, a link means interconnecting the second end of said first lever and a first end of said second lever, a switch actuated by said second lever, and a spring interconnecting the second ends of said first and second levers, said spring maintaining a substantially unidirectional load on all of the enumerated connections and biasing said first lever toward said element.

5. A temperature sensitive controller comprising, a frame, a temperature sensing element carried by said frame, a member adjustably positionable in said frame relative to said element, a first lever pivoted intermediate its two ends in said member, a connection between said element and a first end of said first lever, said connection including a strain release, a second lever pivoted intermediate its two ends in said frame, means on said frame cooperating with said second lever limiting pivotal movement thereof, a link interconnecting the second end of said first lever and a first end of said second lever, control means actuated by said second lever, and a spring interconnecting the second ends of said first and second levers.

6. A temperature sensitive controller comprising, a frame, a temperature responsive element carried by said frame, a first lever pivoted in said frame intermediate its ends and having a first end engaged by said element, a second lever pivoted in said frame intermediate its ends, a link interconnecting said first and second levers and pivoted to the second end of said first lever and to a first end of said second lever, a switch actuated by said second lever, and a spring interconnecting the second end of said first lever and the second end of said second lever.

7. A controller comprising, a frame, a condition responsive element carried by said frame, a first lever pivoted in said frame intermediate its two ends and having a first end adapted to be positioned by said element, a second lever pivoted in said frame intermediate its two ends, a linkage interconnecting the second end of said first lever and a first end of said second lever, control means actuated by said second lever, and a spring interconnecting the second end of said first lever and the second end of said second lever.

8. A controller comprising, a frame, a condition responsive element carried by said frame, a first lever pivotally connected intermediate its ends to said frame, a connection between a first end of said lever and said element, a second lever pivotally connected intermediate its ends to said frame, means interconnecting the second end of said first lever and a first end of said second lever, control means actuated by said second lever, and a tension spring interconnecting the second ends of said levers, said spring maintaining a substantially unidirectional load on all of the enumerated connections.

References Cited in the file of this patent
UNITED STATES PATENTS

| Re. 17,304 | Knaak | May 28, 1929 |
| 1,643,858 | Sauvage | Sept. 27, 1927 |
| 1,654,315 | Wensley | Dec. 27, 1927 |
| 1,660,256 | Cowley | Feb. 21, 1928 |
| 1,690,689 | McCabe | Nov. 6, 1928 |
| 2,509,311 | Oaks | May 30, 1950 |